(12) United States Patent
Kagle et al.

(10) Patent No.: US 7,254,280 B2
(45) Date of Patent: *Aug. 7, 2007

(54) METHOD AND APPARATUS FOR REDUCING IMAGE ACQUISITION TIME IN A DIGITAL IMAGING DEVICE

(75) Inventors: Jonathan C. Kagle, Redmond, WA (US); Gilad Odinak, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/398,381

(22) Filed: Apr. 5, 2006

(65) Prior Publication Data

US 2006/0210194 A1    Sep. 21, 2006

Related U.S. Application Data

(63) Continuation of application No. 09/672,450, filed on Sep. 29, 2000, now Pat. No. 7,027,665.

(51) Int. Cl.
  *G06K 9/36* (2006.01)
(52) U.S. Cl. .................. 382/284; 382/173; 382/303
(58) Field of Classification Search ........... 382/173, 382/284, 302–304, 307
See application file for complete search history.

(56) References Cited

U.S. PATENT DOCUMENTS

| | | | |
|---|---|---|---|
| 4,484,349 A | 11/1984 | McCubbrey | |
| 4,541,116 A | 9/1985 | Lougheed | |
| 4,764,971 A | 8/1988 | Sullivan | |
| 4,979,050 A * | 12/1990 | Westland et al. | 386/52 |
| 4,979,096 A | 12/1990 | Ueda et al. | |
| 5,140,647 A | 8/1992 | Ise et al. | |
| 5,682,197 A | 10/1997 | Moghadam et al. | |
| 5,732,230 A * | 3/1998 | Cullen et al. | 715/764 |
| 5,809,176 A | 9/1998 | Yajima | |
| 5,848,185 A | 12/1998 | Koga et al. | |
| 5,850,487 A | 12/1998 | Takane et al. | |
| 5,923,339 A | 7/1999 | Date et al. | |
| 5,986,668 A | 11/1999 | Szeliski et al. | |
| 6,054,999 A | 4/2000 | Strandberg | |
| 6,173,077 B1 | 1/2001 | Trew et al. | |
| 6,288,743 B1 | 9/2001 | Lathrop | |
| 6,389,417 B1 | 5/2002 | Shin et al. | |
| 6,411,742 B1 | 6/2002 | Peterson | |
| 6,496,598 B1 | 12/2002 | Harman | |
| 6,614,939 B1 | 9/2003 | Yamauchi | |
| 6,714,249 B2 * | 3/2004 | May et al. | 348/373 |

* cited by examiner

*Primary Examiner*—Daniel Mariam
(74) *Attorney, Agent, or Firm*—Amin, Turocy & Calvin, LLP

(57) ABSTRACT

A method and apparatus for reducing the image acquisition time in a digital imaging device by processing segments of the image through an image processing pipeline and storing the processed image segments. Processing segments of the image allows the digital imaging device to write processed data segments to a storage medium while other image segments are being processed. Any portion of the image processing pipeline may be divided to perform parallel processing on the image segments to increase processing speed.

18 Claims, 6 Drawing Sheets

METHOD AND APPARATUS FOR REDUCING IMAGE ACQUISITION TIME IN A DIGITAL IMAGING DEVICE

CROSS-REFERENCE TO RELATED APPLICATION(S)

This application is a continuation of U.S. patent application Ser. No. 09/672,450, filed Sep. 29, 2000 now U.S. Pat. No. 7,027,665, and entitled, "METHOD AND APPARATUS FOR REDUCING IMAGE ACQUISITION TIME TN A DIGITAL IMAGING DEVICE". The entirety of the above-noted application is incorporated herein by reference.

TECHNICAL FIELD

The present invention relates to digital image processing. More particularly, the present invention is directed to a method and apparatus for reducing the time required to process and store an image on a storage medium in a digital imaging device.

BACKGROUND OF THE INVENTION

In today's digital world, digital imaging devices, such as digital cameras, are enjoying great success. While digital imaging devices may provide superior image quality and versatility to the user, the rate with which an image is acquired in these devices is often slow. This is usually due to image processing operations performed by the device prior to storing the image on a storage medium.

More particularly, in digital imaging devices, an image is captured by an image sensor and the raw image data is supplied to a central processing unit (CPU) for processing. The processing usually includes conventional image processing and compression of the image data. The processed image data is then stored onto a storage medium. A significant period of time is often required to perform the image processing. More particularly, each part of the image processing pipeline is usually performed sequentially on the entire image. The processed image data is then stored onto a storage medium. Writing the image data for the entire image is also a time-consuming process, often much greater than the image processing. In addition, many digital imaging devices are unusable during the time from when the image is obtained by an image sensor until it is stored on the storage medium. Therefore, digital imaging devices do not efficiently support the rapid capture of a series of images.

In an effort to address this problem, digital imaging devices have been developed that delay image processing until some time after the raw image data has been stored. More particularly, these devices include a storage medium that is usually large enough to store the raw data for up to 10 images. The raw image data is stored on the storage medium, and the CPU processes the raw data at a later time. However, this approach continues to suffer from the disadvantage of limited ability to support the rapid capture of a series of images, and suffers from the additional disadvantage of requiring a large amount of memory.

Other devices buffer images that have already been processed, which also requires a large amount of memory. In addition, this technique suffers from the problem of risking picture loss as the imaging device reports "ready" before the image has been completely written to the permanent storage device.

Therefore, there is a need for a method and apparatus that provides for decreased image acquisition time in digital imaging devices. More particularly, there is a need for a method and apparatus that enables a digital imaging device to capture multiple images rapidly by decreasing the time period between capturing a first image and being prepared to capture another image.

SUMMARY OF THE INVENTION

The deficiencies and limitations of the prior art are overcome by the present invention, which provides a method and apparatus for decreasing the image acquisition time in digital imaging devices. More particularly, according to the present invention, the image acquisition time is reduced by processing segments of an entire image and storing the processed image segments onto the storage medium.

According to another aspect of the present invention, at least a portion of the image processing pipeline may be divided into a plurality of pipeline stages to provide parallel processing of the image segments.

According to yet another aspect of the invention, stitching may be performed on the processed image segments stored onto the storage medium to restore the entire image.

These and other objects and features of the present invention will be apparent upon consideration of the following detailed description of preferred embodiments thereof, presented in connection with the following drawings in which like reference numerals identify like elements throughout.

DETAILED DESCRIPTION OF THE INVENTION

Figure 1:
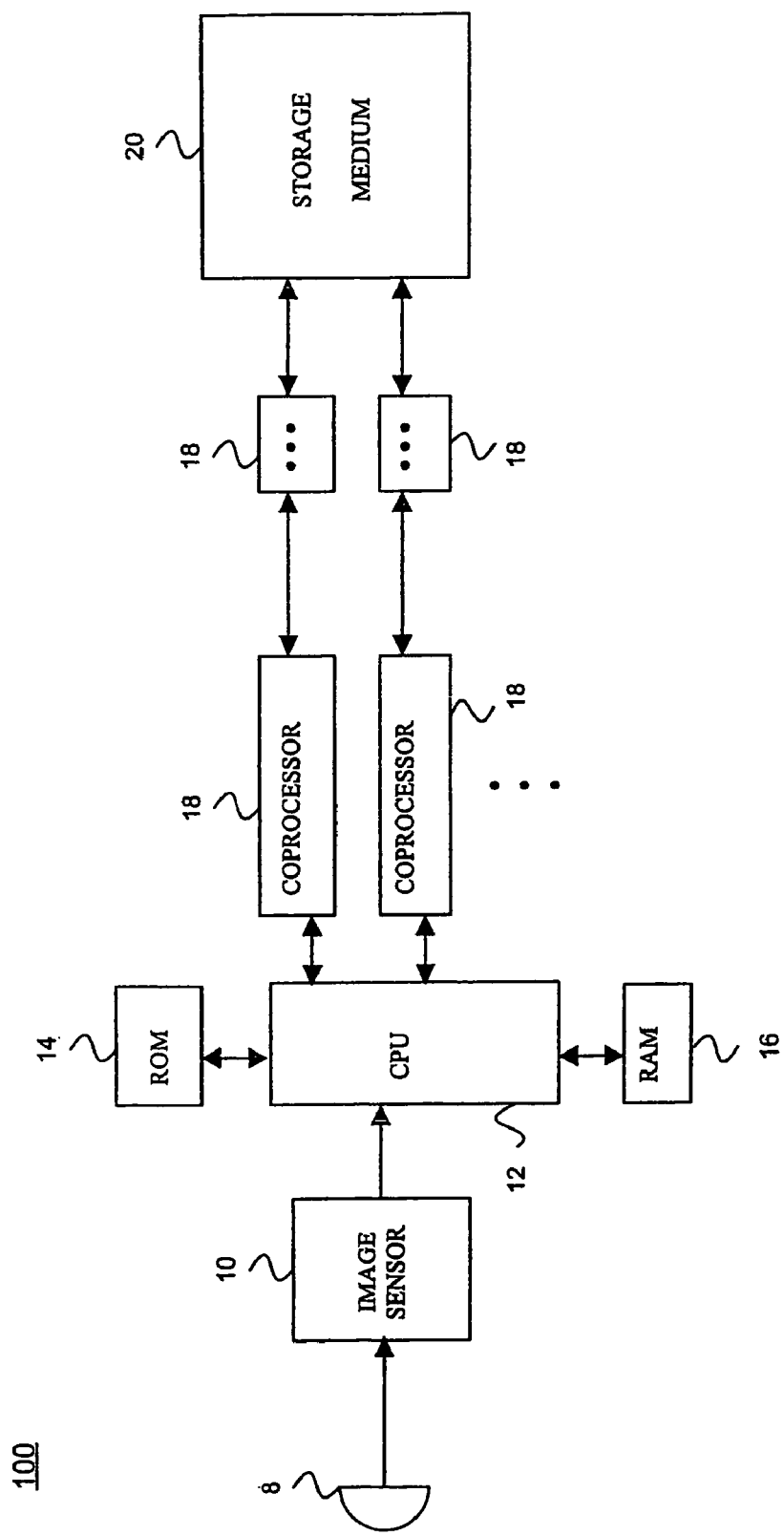
FIG. 1 shows the basic elements of a digital imaging device according to the present invention.

Referring to FIG. 1, the basic elements of a digital imaging device 100 include a lens 8 and an image sensor 10 for obtaining an image and a central processing unit (CPU) 12 for processing the image data supplied from the image sensor 10. The image sensor 10 may be a CCD, a CMOS sensor, a Super CCD as sold by Fuji Photo Film, or any other suitable image sensing device. The CPU 12 controls the processing of the image data based upon program data stored in ROM 14. The CPU 12 may perform all of the image processing or the device 100 may include co-processors 18, in addition to the CPU 12, for performing the image processing operations. The device 100 also includes RAM 16 for data storage. A storage medium 20 is provided for storing the processed image data. The storage medium 20 may be any appropriate memory such as a hard disk, floppy disk, flash memory, or any digital recording medium as is known in the art.

Figure 2:
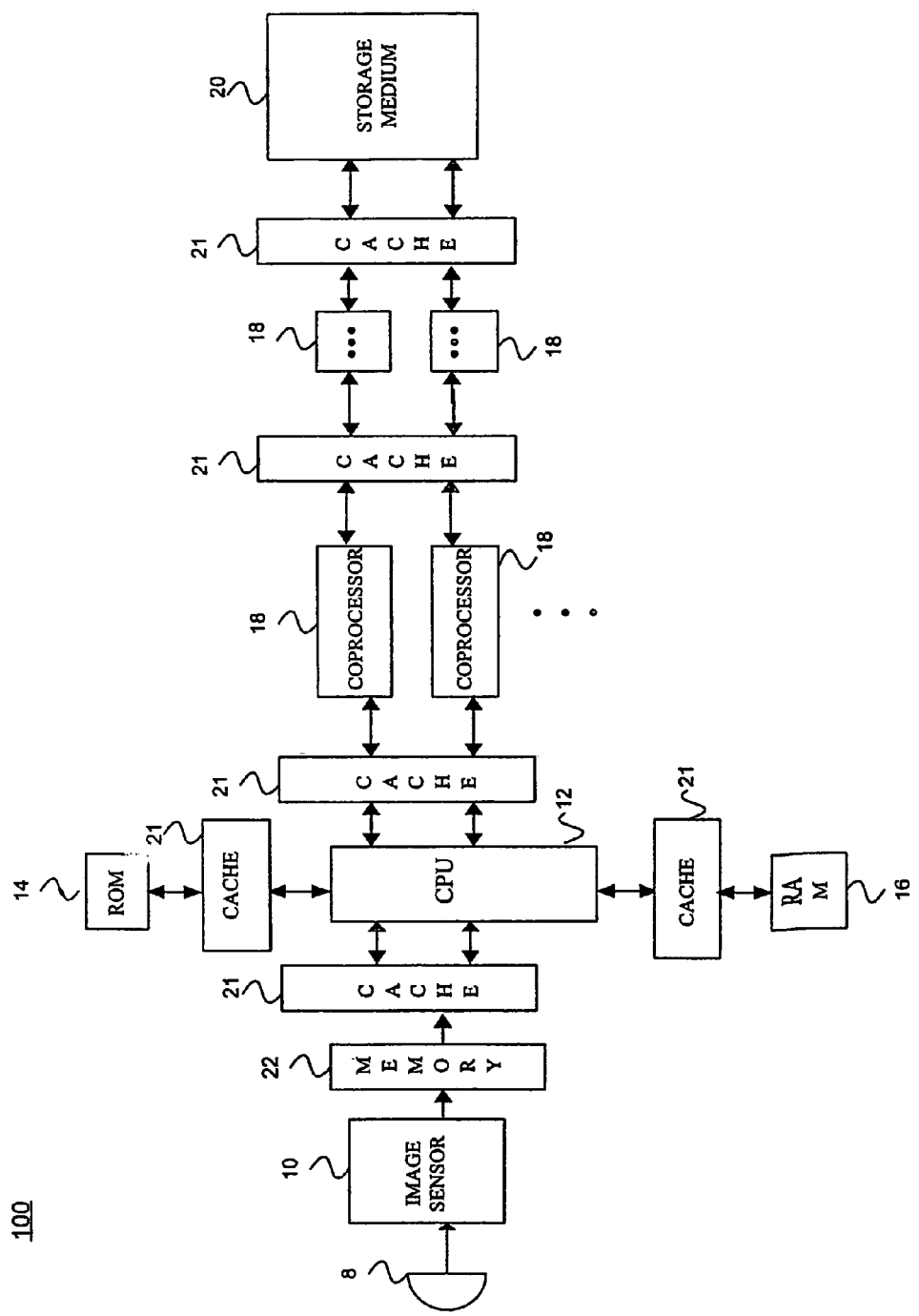
FIG. 2 shows another arrangement of the basic elements of the digital imaging device according to the present invention.

The image data from the image sensor 10 may be supplied to the CPU 12, as shown in FIG. 1. In another arrangement, shown in FIG. 2, the image data may be supplied to a memory 22 from which the CPU 12 reads the image data for processing. A cache 21 may be arranged at any point or at multiple points in the device 100, as shown in FIG. 2. Image data may be stored in any of a number of different formats supported by the digital imaging device 100. Examples of these formats include GIF, JPEG, BMP (Bit Mapped Graphics Format), TIFF, FlashPix, etc. Each of these data formats are well known in the art and do not require description herein.

Figures 3A, 3B:
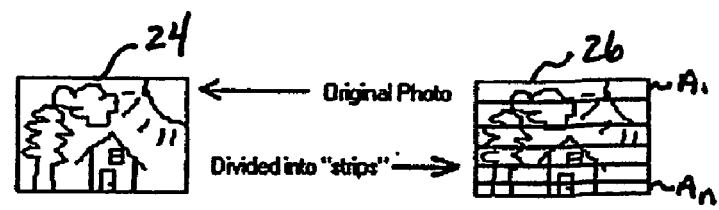
FIGS. 3A and 3B respectively show an original image and image segments of the original image.
Figure 4:
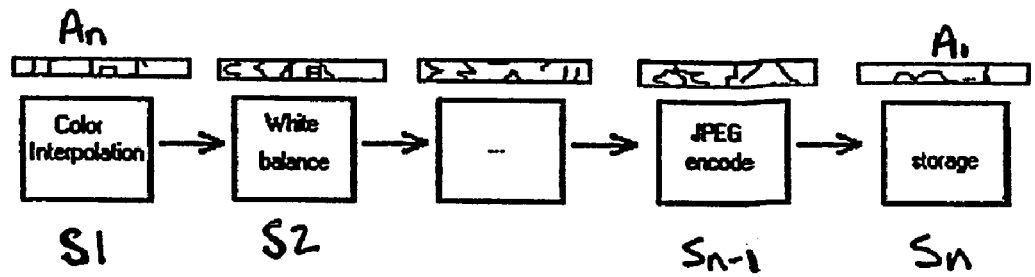
FIG. 4 shows an example of image processing operations performed on the image segments shown in FIG. 3B.

According to an embodiment of the invention, the CPU 12 divides the image data into segments, as shown in FIGS. 3A and 3B. More particularly, the CPU 12 receives the image data for the original image 24 shown in FIG. 3A, and identifies the beginning and ending locations of image segments A1-An, as shown in FIG. 3B. The image segments may or may not be arranged to overlap. In the present example, the CPU 12 and the co-processors 18 perform conventional image processing of the image segments A1-An, such as color interpolation in step S1, white balance in step S2, etc., and conversion of the data to a particular format in step Sn−1 such as the JPEG format. Finally, the image segments are stored on the storage medium 20 in step Sn. The image segments are processed through the image processing pipeline. As the processed image segments arrive at the storage medium 20, they are stored. The device 100 may also be arranged to perform some image processing before the image is segmented (e.g., excess noise or color separation added to be eliminated on stitching, as discussed below).

According to the present invention, the image sensor 10 may output the entire image to the CPU 12 or it may output each line to the CPU 12 in a bucket-brigade manner. For example, the image sensor 10 may be a CCD sensor that operates in a bucket-brigade manner so that the image data is transferred from the sensor 10 one line at a time and is stored in a memory 22. When a line of image data is output from the sensor 10, the line of image data previously stored in memory 22 is shifted out of the memory 22 and supplied to the CPU 12. Usually, the CCD outputs the image data in segments of pixel width or the image is bucket brigaded in pixel width. Therefore, the CCD sensor outputs the image in image segments that are processed as discussed above.

The image may be segmented into any appropriate number of segments that facilitates increased image acquisition speed and that the device is equipped to process. In addition, the image may be segmented vertically, horizontally, diagonally, in rectangular sectors, or in other types of physical or logical groupings. For example, the system may scan the image to determine the general orientation of the picture elements and process along the general direction of the elements. As noted above, the segments may overlap with one another. The segmentation of the image may depend upon the length of the image processing stages and the level of organization available for processing. The level of image segmentation may also be determined based upon the amount of time each processing step requires and the overhead of moving each image segment and stitching it with the other image segments. The digital imaging device 100 may be preprogrammed to a particular segmentation level, or the device may be provided with a number of default levels. The default levels may be selected by the CPU 12 based upon parameters such as resolution, white balance, etc. One of ordinary skill in the art will appreciate that there may be many ways to implement the image segmentation.

Figure 5:
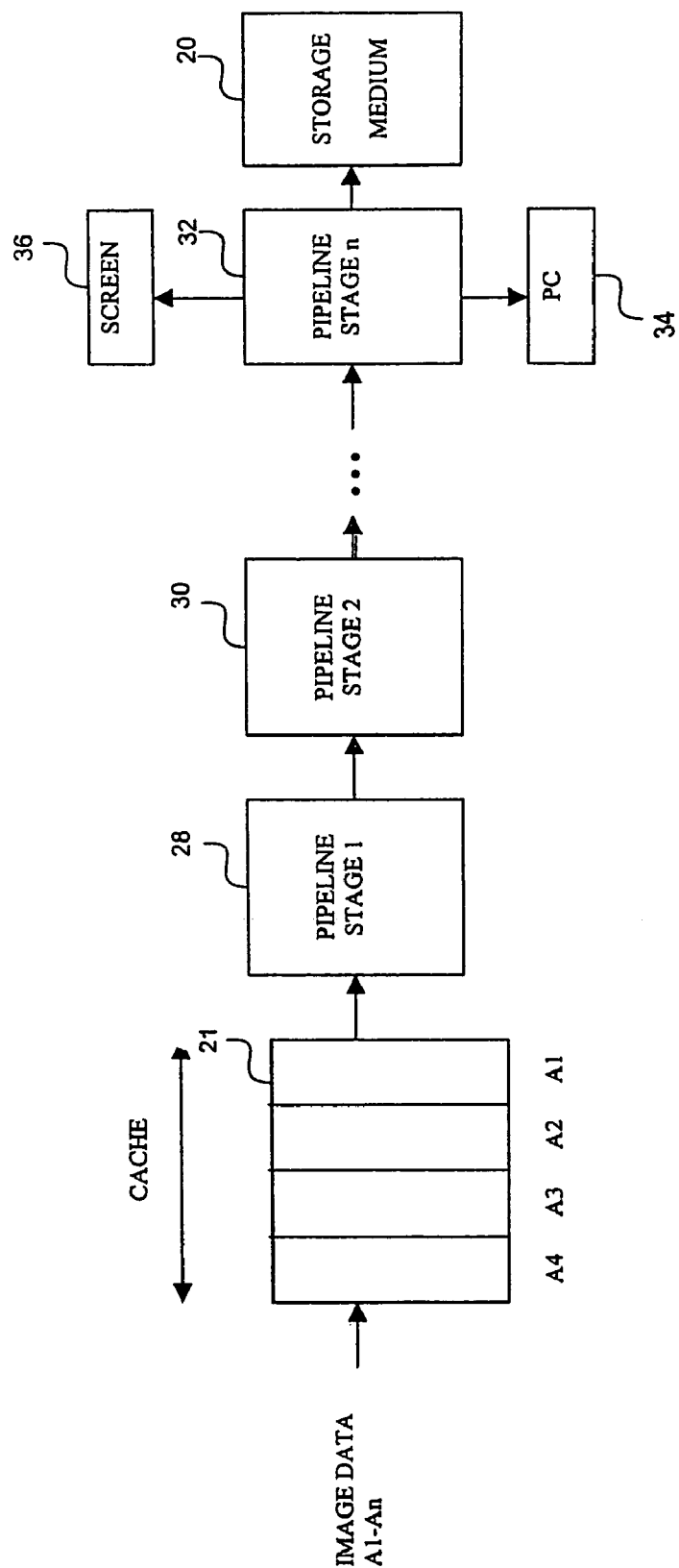
FIG. 5 shows an example of an image processing pipeline according to an aspect of the present invention.

An example of the pipeline processing of the image segments is illustrated in FIG. 5. The image data may be supplied to the cache 21, which stores the image data as segments A1, A2, A3 and A4, for example. The cache 21 may store a table that includes the starting and ending locations for each of the data segments of the image data. The image data from the cache 21 is supplied to the image processing pipeline at pipeline stage 1 28. Image processing then begins on the first data segment A1. Data segment A1 is transferred from pipeline stage 1 28 to pipeline stage n 32 to complete image processing of data segment A1. Data segment A1 may then be stored on the storage medium 20. Similar processing occurs for each of the remaining data segments A2, A3 and A4. Data segment A1 may be stored onto the storage medium 20 while image processing continues on other data segments of the image data. Therefore, according to the present invention, image processing may be occurring concurrently with writing to the storage medium 20. The pipeline processing of the data segments increases the processing speed of the digital imaging device 100. More particularly, this pipeline processing of the data segments reduces the time from obtaining the image at the image sensor 10 to the time when the image data is available to begin storing on the storage medium 20.

The image data may also be supplied to a screen 36 or a personal computer (PC) 34, or any other appropriate device. In addition, those of ordinary skill in the art will appreciate that the device 100 may include buffers to facilitate the pipeline processing operation.

Figure 6:
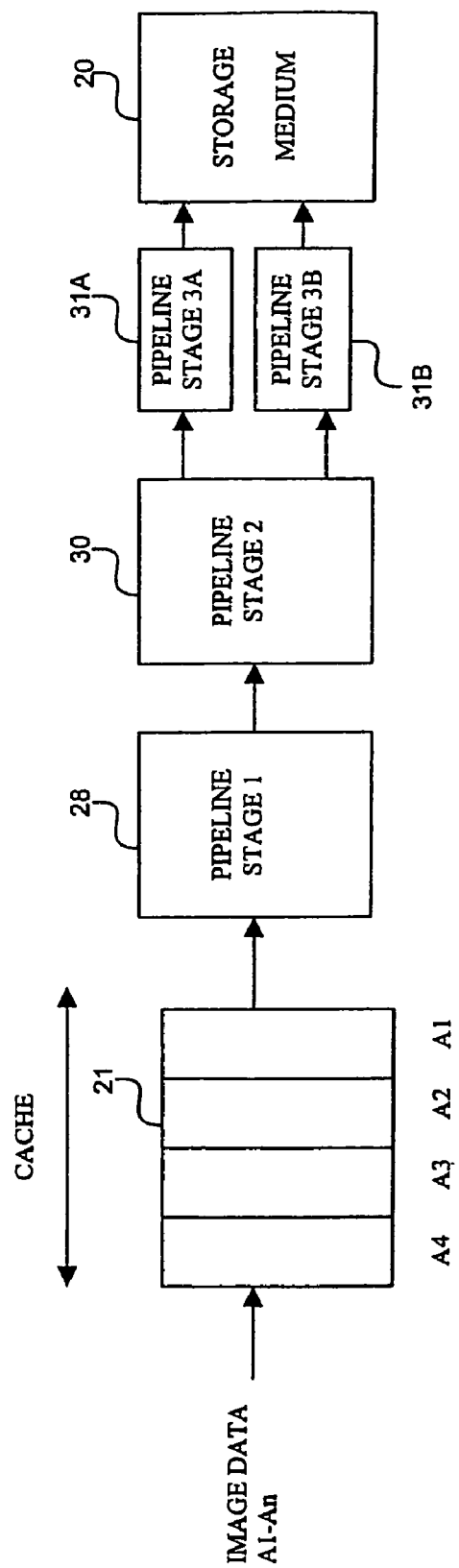
FIG. 6 shows an example of an image processing pipeline according to another aspect of the present invention.

According to another aspect of the present invention, some or all of the image processing pipeline stages may be separated to perform parallel processing of the image data segments, as shown in FIG. 6. In this example, one of the pipeline stages, pipeline stage 3 is separated into parallel pipeline stages 3A 31A and 3B 31B. In this arrangement, different data segments of the image are processed in parallel in stages 3A and 3B. One of ordinary skill in the art will appreciate than any one or a number of the image processing pipeline stages may be separated into a plurality of parallel stages to decrease overall processing time. The device 100 may include buffers to facilitate the processing operation. For example, if a pipeline stage is divided into multiple parallel processing stages, and the device 100 allows processed segments to be output out of order, a buffer may be provided to enable appropriate ordering of the processed data.

Once an image segment has been processed, it is stored on the storage medium 20. Since the writing operation begins as soon as the first image data segment is received at the storage medium 20, the delay in image acquisition due to writing speed is minimized, if not eliminated. When each image segment is stored onto the storage medium 20, it may be stitched to the previously stored image segment. As is well known in the art, stitching includes combining contiguous or overlapping blocks of data to form a complete block of data. The data segments stored on the storage medium 20 may be stitched together to form the entire image. The stitching order may be in many orientations and orders, such as from top to bottom, right to left, bottom to top, left to right. However, stitching is usually done in the order that the data segments are written to the storage medium 20. In addition, the stitching may occur by buffering one data segment, performing the stitching operation for the segment, and then writing the data to the storage medium 20. In another arrangement, the data segments may be written to the storage medium 20 as they arrive, and then stitched in place.

In some cases, the data segments may simply be stored on the storage medium 20 with what amounts to a null stitching operation. For example, some data formats include boundaries for the data, such as 8×8 or 32×32 pixel boundaries. In these cases, the data segments may be identified along those boundaries. Then, upon storage onto the storage medium 20, each data segment may simply be stored after the previously stored data segment. However, in general, data processing, such as data compression, usually involves interaction or dependency between pixels of the image data. While it may not be necessary to stitch every time a data segment is stored onto the storage medium 20, if the pixels in one data segment are dependent upon pixels in another data segment, then stitching will likely be required.

Stitching may provide an opportunity to modify image data based upon total image data. More particularly, stitching may involve making changes or modifications to other data segments beyond the two data segments that are being stitched together. For example, a particular parameter may be set after analyzing one data segment. It may be determined later that the initial setting for the parameter, based on the single segment, is not appropriate for the entire image. Stitching allows for the possibility of going back and making modifications to the image data.

When the data segments are overlapping, processing occurs using pixels that extend beyond the particular data segment being processed. Once the data segment is processed, any duplicate image data may be discarded. Processing overlapping data segments may improve the overall performance of the imaging device 100 by minimizing the amount of modification required upon stitching. More particularly, initial processing decisions for the data segment may be more accurate since each data segment is processed using information from adjacent image segments providing a better perspective of the image.

In some cases, the resulting image file may require a header or some other information to be added or updated based on the complete image. This may be accomplished by "patching" the image file after all of the image data segments have been written onto the storage medium 20. For example, some data files include information at the very beginning of the file such as filename, when the file was created, how many bytes are in the file, etc. Some information may not be known until the last data segment is stored onto the storage medium 20, such as the number of bytes. According to the present invention, this information may be added at the end of the storage process, or may be updated every time a new data segment is stored or at some other appropriate time.

Figure 7:
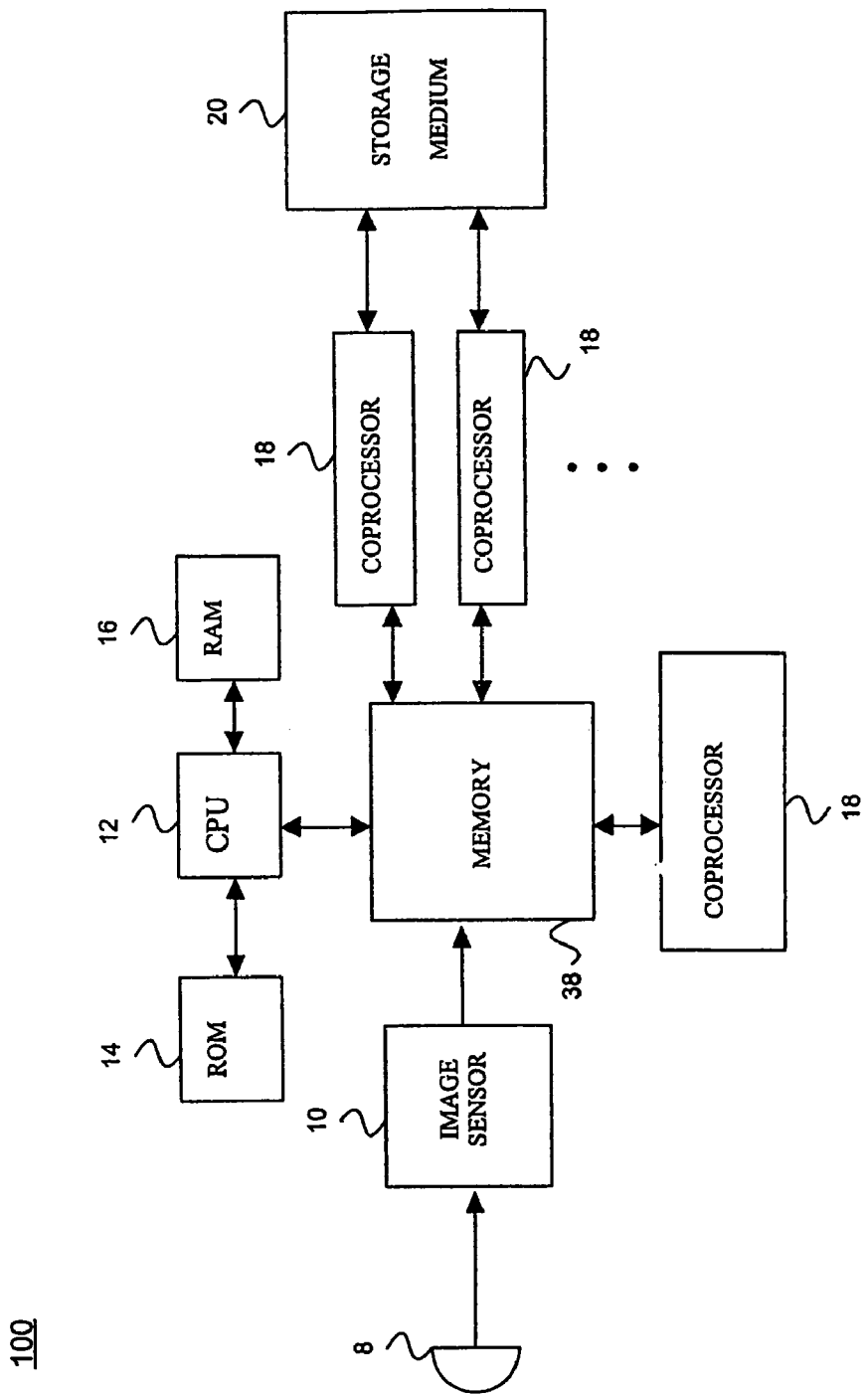
FIG. 7 shows another arrangement of the basic elements of the digital imaging device according to the present invention.

Referring to FIG. 7, another embodiment of the invention is shown. According to this embodiment, the image data from the image sensor 10 is stored in memory 38 and the CPU 12 and each of the co-processors 18, for example, read and process different image segments and then store the processed image segments onto the storage medium 20. This arrangement may be more efficient than that shown in FIGS. 1 and 2 when there is no specific hardware architecture to support multiple processors performing the pipeline processing of the data segments. The device 100 may be arranged so that a buffer that receives data from the image sensor 10 is used throughout the image pipeline processing operation; that is, the same buffer may be re-used throughout the processing operation.

If, for some reason, processing cannot continue in the device 100 shown in FIG. 7, the pipeline may be stalled until processing can be resumed. For example, if processed data is output out of order, the pipeline may be stalled until the necessary data segments are available for continued processing. Alternatively, buffers may be provided to allow the pipeline to continue processing when data is output out of order. One of ordinary skill in the art will understand that the device 100 may be arranged in any number of architectures to support processing of the image segments.

While particular embodiments of the invention have been shown and described, it is recognized that various modifications thereof will occur to those skilled in the art without departing from the spirit and scope of the invention. For example, the invention may be implemented using data schema or web pages rather than the directory structure described herein. The described embodiments are to be considered in all respects only as illustrative and not restrictive. Therefore, the scope of the herein-described invention shall be limited solely by the claims appended hereto.

What is claimed is:

1. A digital image processing methodology, comprising:
   storing processed segments of a digital image to a persistent storage medium, wherein the number of segments is based at least upon image acquisition speed;
   stitching together the processed segments within the persistent storage medium to reconstruct the digital image; and making changes or modifications to image segments outside of processed segments currently being stitched together.

2. The method of claim 1 further comprising initiating writing a first image data segment to the persistent storage medium upon being processed.

3. The method of claim 1, farther comprising combining contiguous or overlapping segments of data to form a complete block of data.

4. The method of claim 1, farther comprising stitching the segments in order of respective segments being written to the persistent storage medium.

5. The method of claim 1, further comprising making modifications to a segment after it is determined that the segment as processed or stitched is not appropriate for a reconstructed version of the digital image.

6. The method of claim 1, farther comprising using pixels that extend beyond overlapping image segments to stitch the overlapping segments.

7. A digital camera, comprising:
   a persistent storage medium; and
   a processor that divides a digital image into a plurality of image segments, performs image processing on each of the plurality of image segments, stores the processed image segments on the persistent storage medium, and as respective processed image segments are stored stitches such segments together to regenerate the digital image within the persistent storage medium, wherein the processor determines the number of segments based in part on image acquisition speed, the processor makes changes or modifications to image segments outside of the image segments currently being stitched together.

8. The digital camera of claim 7, the persistent storage medium is flash memory.

9. The digital camera of claim 7, the persistent storage medium is a hard drive.

10. The digital camera of claim 7, the processor identifies beginning and end locations of the image segments.

11. The digital camera of claim 7, the processor performing some image processing on the digital image prior to dividing the digital image into segments.

12. The digital camera of claim 7, the processor determining the number of segments based in part on at least one image capture parameter.

13. The digital camera of claim 7, the processor determining the number of segments as a function of segment processing time, overhead of moving respective segments from memory to the CPU, and overhead associated with stitching the respective segments, wherein overhead is at least one of time, processor utilization, or memory utilization.

14. The digital camera of claim 7 includes a plurality of default segmentation levels.

15. The digital camera of claim 7, the processor initiates writing a first image data segment to the persistent storage medium upon being processed.

16. The digital camera of claim 15, the processor performs stitching of the segments within the persistent storage medium by combining contiguous or overlapping segments of data to form a complete block of data.

17. The digital camera of claim 16, the processor stitches the segments in order of respective segments being written to the persistent storage medium.

18. A digital imaging processing system comprising:

means for capturing a digital image;

means for dividing the digital image into segments, processing the segments, initiating writing of the processed segments to a persistent storage medium, and stitching respective segments together after being written to the persistent storage medium, wherein the number of segments is based at least upon the length of time to process each segment means for making changes or modifications to image segments outside of the respective segments currently being stitched together.

* * * * *